April 21, 1970  A. B. ROGERS ET AL  3,507,207
SYSTEM FOR POULTRY INJECTION
Filed Jan. 24, 1968  3 Sheets-Sheet 1
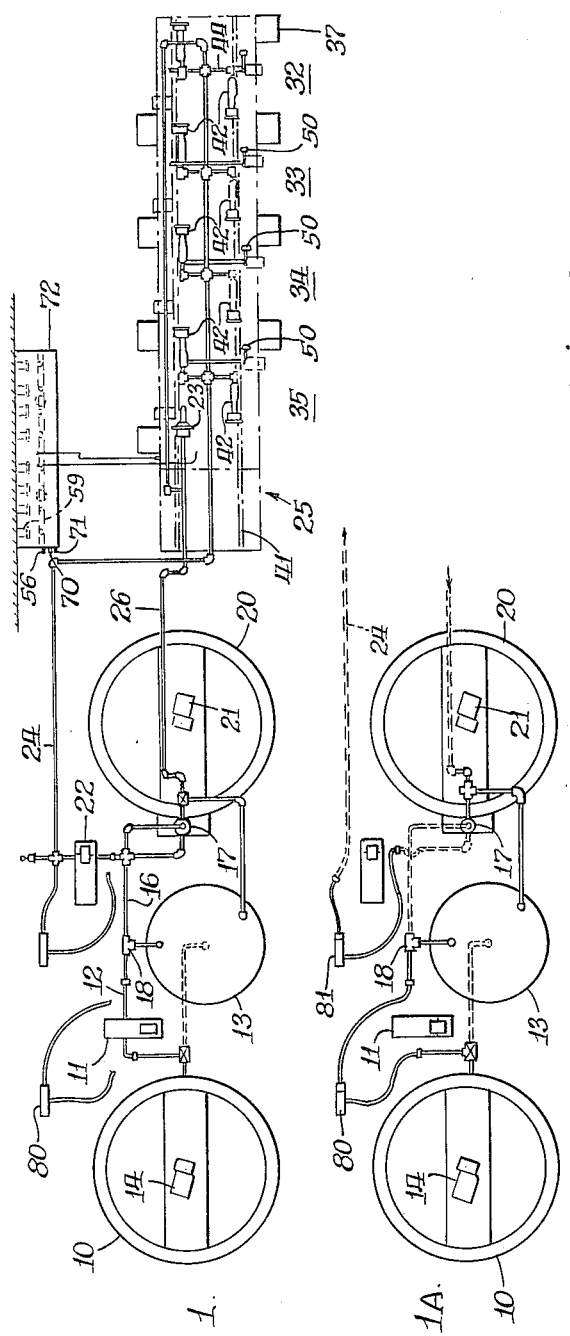
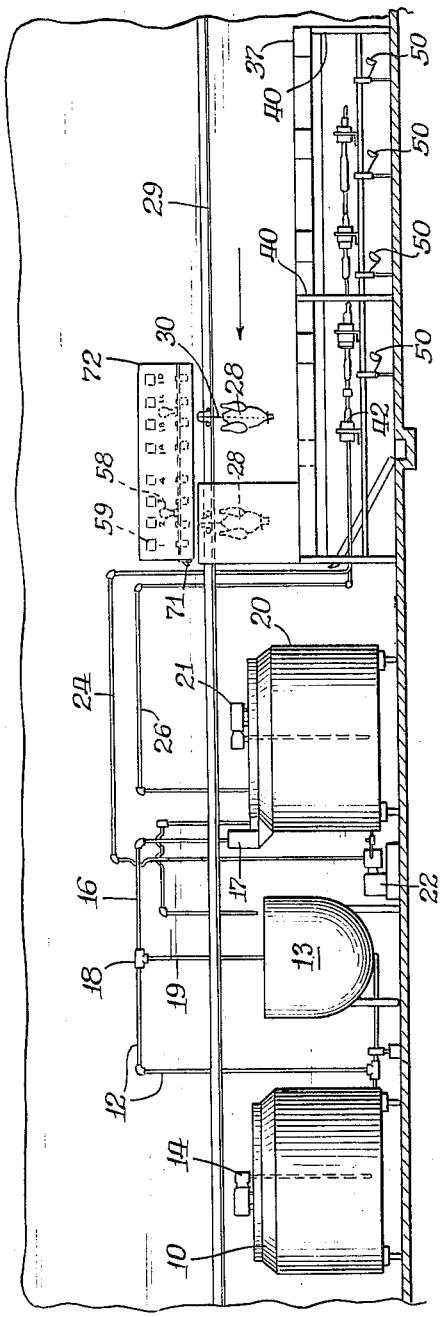
Inventors:
Alan B. Rogers
Donald V. Schwall
Russell W. Posegate
By: Carl C. Batz
Atty.

April 21, 1970 A. B. ROGERS ET AL 3,507,207
SYSTEM FOR POULTRY INJECTION
Filed Jan. 24, 1968 3 Sheets-Sheet 2
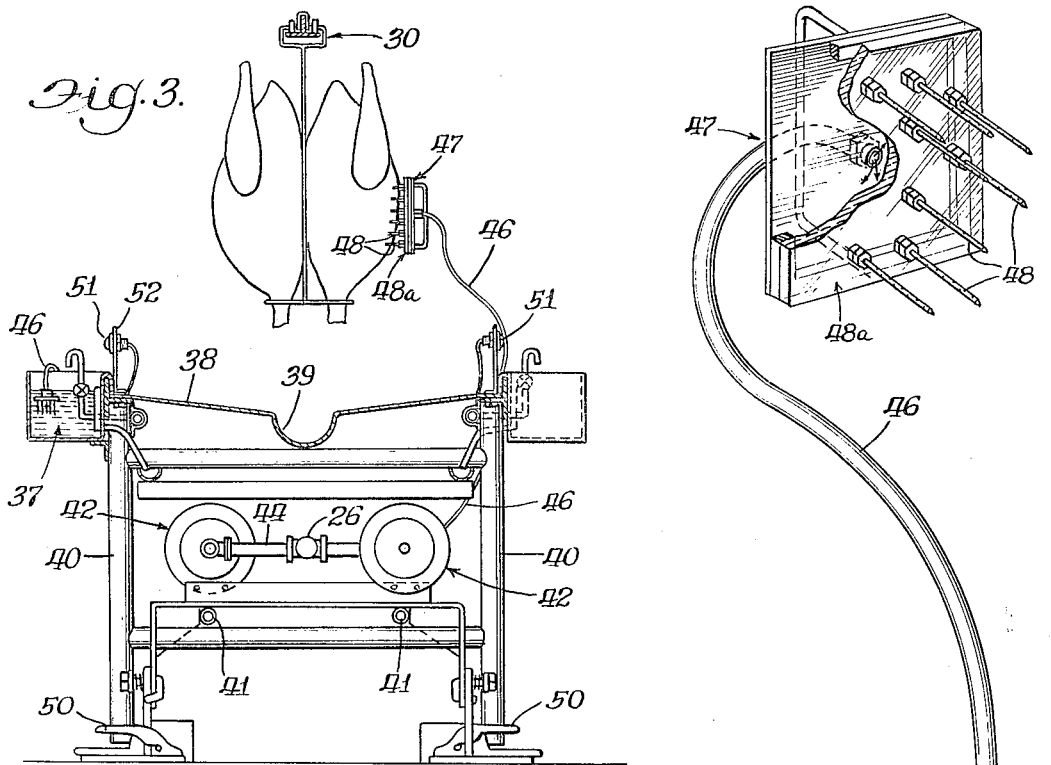
Fig. 3.
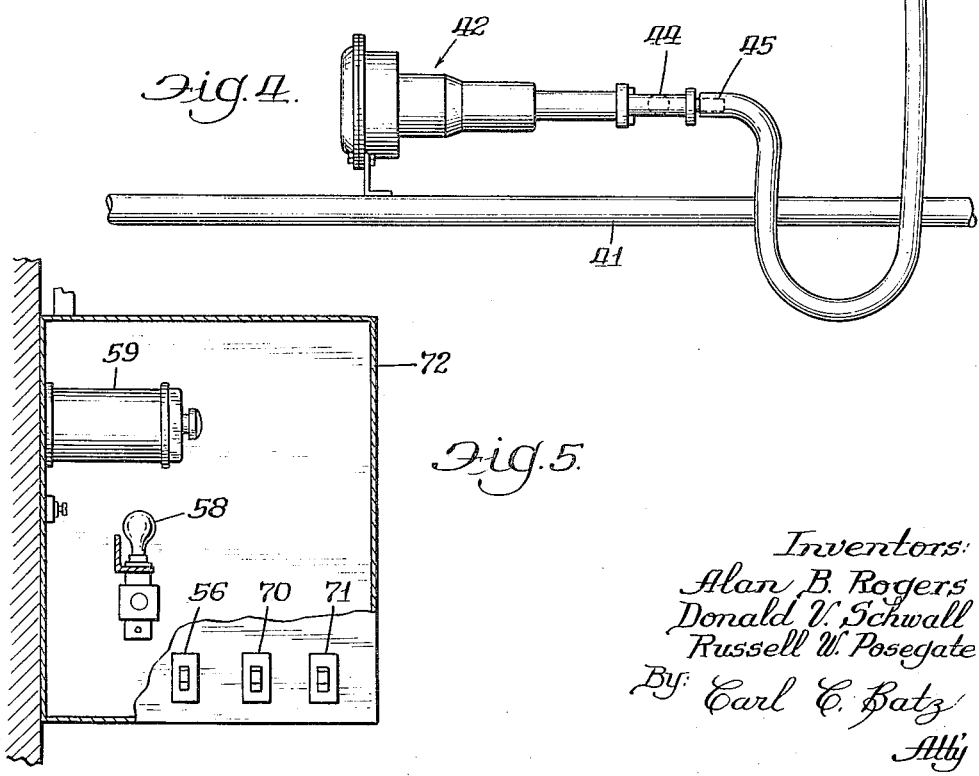
Fig. 4.
Fig. 5.
Inventors:
Alan B. Rogers
Donald V. Schwall
Russell W. Posegate
By Earl C. Batz
Atty

United States Patent Office 3,507,207
Patented Apr. 21, 1970

3,507,207
SYSTEM FOR POULTRY INJECTION
Alan B. Rogers, Palos Park, Donald V. Schwall, Glen Ellyn, and Russell W. Posegate, La Grange Park, Ill., assignors to Armour and Company, Chicago, Ill., a corporation of Delaware
Filed Jan. 24, 1968, Ser. No. 700,104
Int. Cl. A23b 1/16
U.S. Cl. 99—257          9 Claims

ABSTRACT OF THE DISCLOSURE

A system for injecting predetermined amounts of an edible fat mixture into turkeys includes apparatus for preparing the mixture under controlled conditions and pumping it to an elongated table above which the individual birds are conveyed. After an operator at a station adjacent the table inserts a set of needles into a predetermined location on a bird, he actuates apparatus including timing mechanism for forcing the mixture under pressure for a predetermined time into the bird. A visual display indicates the time during which the mixture is being injected; and when the preset time elapses, the visual display is de-energized thereby informing the operator that the needles may be removed without squirting the mixture. The sanitary conduit network circulating the injection mixture throughout the system is arranged so that it may be cleaned in-place. An electrical override, when actuated, allows continuous flushing of a cleaning solution through the injection heads and their associated flexible tubing for all stations simultaneously.

BACKGROUND

The present invention relates to a system for injecting predetermined amounts of an edible fat mixture into poultry. Although the invention is not so limited, the disclosure will, at times, refer specifically to turkeys as the poultry being injected since this is the type of poultry with which the present apparatus is preferably used.

The advantages of injection of an edible fat mixture into turkeys are known. However, problems arise in introducing the mixture into the desired locations of the turkey and in conveniently setting the proper amount of mixture to be injected. The weight of the turkeys being processed typically varies by a ratio of at least two to one, and the amount to be injected depends on the weight.

If an operator actuates the injection mechanism and himself determines the amount of mixture injected, variations in the actual amounts injected are too great to be acceptable. If, on the other hand, the measurement of injected volume is independent of the operator, then he has to be careful not to withdraw the needles prior to termination of the injecting step or the fat mixture (which is under fairly high pressure) will be squirted from the needles.

Other problems arise in cleaning the conduit network which carries the injection mixture on a daily or semi-daily basis without having to dismantle the entire network to do so. Although the injection of the mixture is selective and intermittent (whether operator-controlled or externally-controlled), it is preferable to have the cleaning of all the injection heads not only continuous, but simultaneous and actuated by a common switch.

SUMMARY

The present invention provides an elongated table over which the individual turkeys are conveyed; and the table may be remotely located from the apparatus which prepares an edible fat mixture under controlled conditions. A number of operators are located at stations along each side of the table so that each conveyor can hold two turkeys which may be simultaneously processed by facing operators.

After an operator inserts the needles held by the injection head into a bird, he actuates a foot switch which energizes a preset timing mechanism for, in turn, energizing a solenoid. The solenoid is energized for the predetermined amount of time to which its associated timer is set; and the solenoid actuates a valve for coupling the fat mixture under pressure to the injection head or manifold. A pilot or signal light is also energized by the timer for signalling the duration of time at which the pressurized mixture is being injected. After the preset time elapses, the solenoid is de-energized thereby closing the valve and shutting off the injection process; and the pilot light is extinguished thereby signalling the operator that he may remove the injection manifold without squirting the fat.

The volume of the fat mixture injected at each station may be easily adjusted by presetting its timer mechanism. Thus, compensation may be made not only for injecting different amounts of fat in different locations on the turkey such as breast or thigh, but in addition, the volume of injected fluid may be adjusted for turkeys of different weight.

The conduit network which circulates the injection fluid not only includes the piping for coupling the mixture to the injection manifolds, but also a return system to a holding tank so that the mixture can be continuously circulated. This entire conduit network must, of course, be kept absolutely clean; and it would be undesirable to have to dismantle the system, or any major portion of it, in order to clean the conduit network completely. The present invention provides for cleaning the entire sanitary conduit network in-place without having to dismantle it. An electrical override mechanism is provided for continuously and simultaneously operating all of the solenoids along either side of the injection table. Thus, a cleaning fluid introduced into the holding tank will be continuously circulated through all of the injection manifolds simultaneously and into the return conduit network back into the holding tank.

A regulated water bath is provided adjacent to each station along the injection table for warming the injection nozzle to prevent freezing of the injection mixture in the needles.

Other features and advantages of the present invention will be obvious to persons skilled in the art from the following detailed description of a preferred embodiment accompanied by the attached drawing wherein identical reference characters will refer to like elements in the various views.

THE DRAWING

FIG. 1 is a plan view of the apparatus for preparing the injection mixture and the injection table layout;

FIG. 1A is a plan view of a portion of the apparatus of FIG. 1 during the clean-in-place operation;

FIG. 2 is a side elevation view of the apparatus of FIG. 1;

FIG. 3 is a transverse section view of the injection table of FIG. 1;

FIG. 4 is a detailed view of an injection manifold and its associated flexible tubing and operating valve;

FIG. 5 is an end view of the electrical control box, partially in section, of the apparatus of FIG. 1.

DETAILED DESCRIPTION

Figure 6:
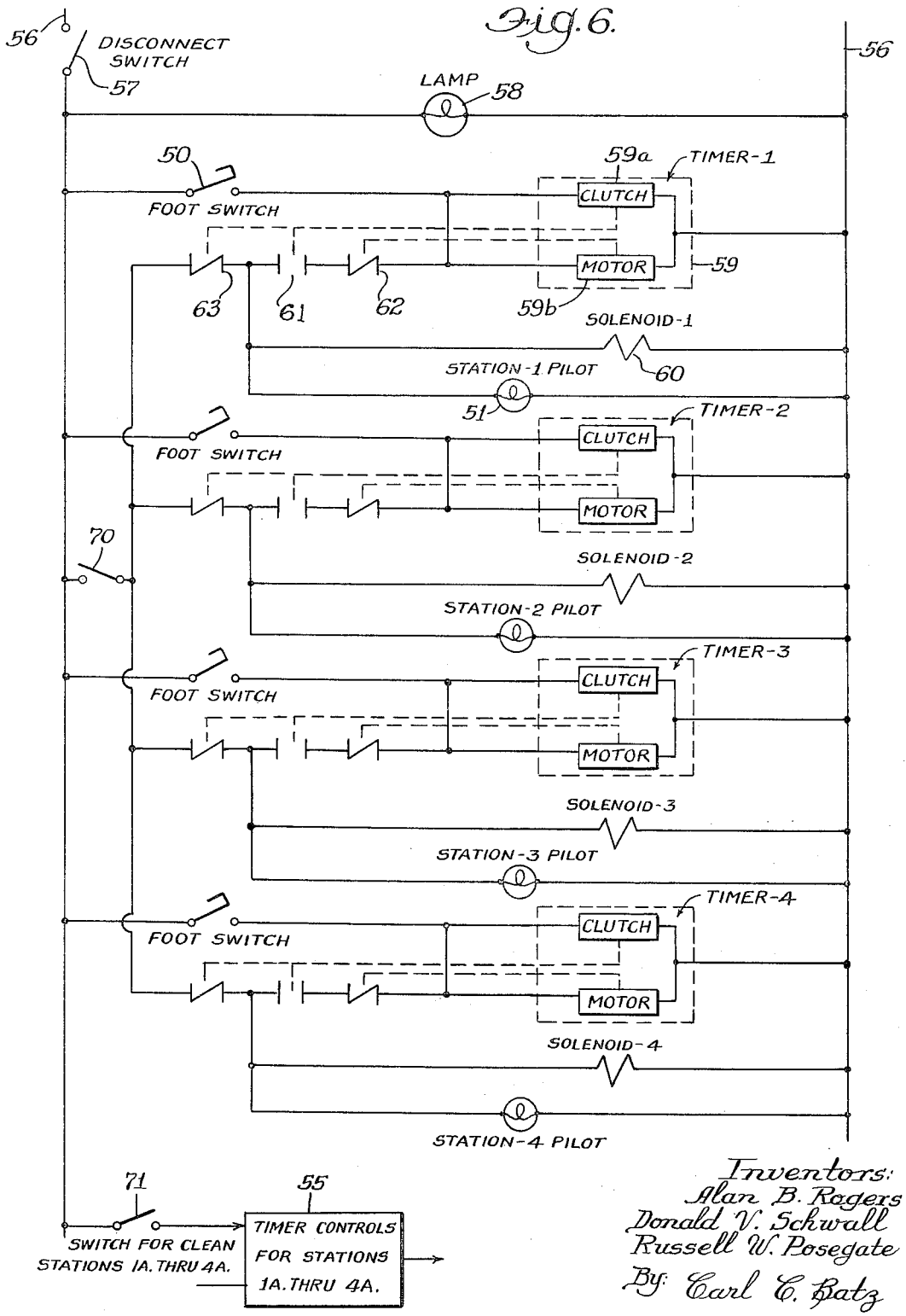
FIG. 6 is an electrical circuit schematic diagram of a controller according to the present invention.

The present system may use any suitable edible fat such as the common edible fats and oils or emulsions or mixtures thereof. For example, fats and oils such as butter, butter oil, corn oil, lard, margarine, cottonseed oil, and other well-known vegetable and animal fats and oils. Preferably, food fats and other glycerides having the characteristics of these fats are used.

In the illustrated embodiment, butter is introduced into a steam-jacketed melting tank 10 (see FIGS. 1 and 2) from where it is pumped by means of a pump 11 through a conduit 12 into a mixing tank 13. Butter which is sufficiently tempered to permit cutting into smaller pieces may be introduced into the melting tank 10 in pieces of one to five pounds. The temperature of the melted butter in the melting tank 10 should be of a temperature which would keep it in semisolid form. The tank 10 is provided with a mixer 14 for facilitating uniform melting of the butter.

After the butter in the melting tank 10 has been liquefied, it is pumped by means of the pump 11 into the mixing tank 13 which is equipped with an air-operated high speed mixer (not shown).

Powdered anhydrous sodium tripolyphosphate is added slowly in a predetermined amount with as much agitation as possible while care is taken to prevent loss of butter.

After sufficiently agitated and thoroughly mixed, the injection mixture is coupled through a conduit 16 into a conventional colloid mill 17. A two-way valve 18 is interposed between the conduits 12 and 16 and a downspout 19 is coupled to this valve to permit two-way flow from conduit 12.

A hand valve regulates the flow through the colloid mill 17 to adjust the input flow equal to the output flow. Further, the colloid mill 17 is set to produce a particle size which may easily be pumped through the needles of the injection manifolds, presently to be described.

The butter-phosphate mixture is extruded from the colloid mill 17 according to conventional technique into a steam/water-jacketed holding tank 20 where it is held with constant agitation by means of an agitator 21 prior to being pumped to the injection table.

A second pump 22 receives the mixture stored in the holding tank 20 and pumps it through an input conduit 24 to the injection table which is generally illustrated by reference numeral 25 in the drawing.

The pump 22 forces the mixture in the feed line 24 at a pressure of approximately 60 p.s.i. The butter is continuously circulated through feed line 24 and return conduit 26 to prevent freezing. The conduits are preferably one-inch stainless steel tubing; and a conventional pressure-sensitive control 23 automatically maintains the pressure in the line within an acceptable variation from the nominal pressure.

INJECTION TABLE

The injection table 25 is elongated (typically about 20 feet) in the direction in which the turkeys are being conveyed (see particularly FIG. 2 wherein turkeys are identified by reference numeral 28).

The turkeys are arranged on a conveyor generally designated 29 and suspended from a hooking device 30 in pairs setting back-to-back so that the breast portions of the turkeys 28 face opposing sides of the table 25. Thus, a team or unit of operators placed on either side of the injection table 25 process a single turkey as it proceeds down the conveyor.

For simplicity, the operation of only one unit of operators will be explained in greater detail; and it will be understood that each function performed by the unit being explained is duplicated by the opposing unit. Thus, the unit on the bottom half of table 25 is viewed in FIG. 1, is divided into stations generally designated 32, 33, 34 and 35. Since the function of an operator at each of the stations 32–35 is to inject the butter-phosphate mixture into a turkey at a predetermined location, the apparatus provided at each of the stations (except for variation in manifold design) is the same; and for convenience, the apparatus of only one station need be explained in greater detail for an understanding of the invention.

Referring particularly then to station 32, there is provided a temperature-regulated water bath 37 adjacent the station 32 and projecting laterally from the table 25. Referring particularly to FIG. 3, the top of the table 25 is designated 38, and it can be seen that each side is inclined downwardly toward the center of the table 25. At the center, the top 38 defines a central trough 39 which carries away wash water that is continuously sprayed on the table and leaves excess drippings of the fat mixture on the table surface 38 free of water so that it can be collected and reused.

The table 25 is supported by means of legs designated 40. Extending longitudinally of the table 25 and beneath the top 38 is a mounting bar 41 on which is mounted a conventional air-actuated valve 42 beneath the station 32. There are, of course, similar valves at each of the other stations. The valve 42 is actuated by a source of air which is not shown in the diagram for purposes of simplicity.

FIG. 4 illustrates the valve 42 in greater detail; and the input feedline 24 (as seen best in FIG. 1) communicates with the operating ends of the valve means 42 by means of a coupling conduit 44. An output port 45 of the valve 42 receives a flexible conduit 46 which transmits the butter-phosphate mixture to an injection manifold generally designated 47 supporting needles 48 which are inserted in the turkeys. The manifold 47 injects both upper breasts simultaneously. Hence it straddles the keel bone of the turkey; and the needles 48 are progressively longer toward the edges of the manifold. A transparent plastic plate 48a receives the needles 48 while allowing visual inspection of the manifold for solidified fat. Another manifold is required for the two lower breast portions; it is similar to manifold 47 but extends laterally beyond it and includes another row of needles on each side. Manifolds are also required for the right leg (upper and lower) and the left leg (upper and lower). At each of the stations there is a foot-actuated pedal (see pedal 50 for station 32).

As will be clear from subsequent description, an operator inserts the injection manifold 47 in a proper location in the turkey in front of him and depresses the switch 50. A timing mechanism then energizes a solenoid (to be described within) which, in turn, operates the valve 42 so that the coupling conduit 44 communicates with the flexible tubing 46; and the butter-phosphate mixture is injected through the needles into the turkey. At the same time, the timing mechanism energizes a signal light, designated by reference numeral 51 and supported by a bracket 52 fastened to the table 25 adjacent the station 32, which light indicates the time during which the valve 42 is actuated. When the time cycle is complete, the current is cut off thus shutting off the signal light and de-energizing the solenoid. This cuts off the air pressure to valve 42; and an exhaust valve mounted thereon releases the air pressure, and valve 42 closes. When the timer motor runs out, the light 51 is de-energized; and the operator knows that he may withdraw the needles from the turkey without squirting the fluid about. The timer is conventional and has a simple adjustment for presetting the time.

ELECTRICAL CIRCUITRY

Turning now to FIG. 6, the electrical circuitry is shown for those stations on one side of the table 25. The same circuitry is duplicated for the four stations on the opposite side of the table; and this is illustrated in FIG. 6 in schematic form by the block 55. Power is fed into the electrical circuitry through two power lines 56, and a disconnect switch 57 is inserted in series with one of the lines 56. Preferably, the other of the lines 56 is at ground or common potential. A lamp 58 is connected across the power line 56 and energized only when the disconnect switch 57 is closed.

The previously-mentioned foot switch 50 is normally open as shown in FIG. 6; and it is connected in series with a conventional timer 59 across the power lines 56 and adapted to be de-energized when the switch 57 is open. Since the timers for all stages are the same, only the first is described in detail.

The timer 59 includes a clutch 59a and a motor 59b connected in parallel. In circuit with the timer 59 is a normally-open set of contacts 61 (actuated by the clutch 59a) and a normally-closed set of contacts 62 (actuated by the motor 59b). A solenoid 60 is connected between the normally-open contacts 61 and the grounded one of the power lines 56. The filament of the previously-mentioned pilot light 51 (FIG. 3) is connected in parallel with the solenoid 60.

In FIG. 6, sections of the controller associated with the stations 32, 33, 34 and 35 have been designated respectively 1, 2, 3 and 4; and it will be noted that electrical circuitry associated with each of these stations includes a foot switch, a timer, a solenoid, and a pilot light similar in structure and interconnection to those just described. When the solenoid 60 is energized, the pilot light 51 will be lit. A set of normally-closed contacts 63 (also actuated by the clutch 59a) connects a switch 70 to the common junction of the contacts 61 and the solenoid 60. The other terminal of the switch 70 is connected directly to the switch 57. The entire timing mechanism including the clutch 59a, motor 59b, and contacts 61–63 are normally provided as a unit.

In operation, when the foot switch 50 is depressed, both the clutch 59a and the motor 59b are energized, but the motor 59b does not actuate its associated contacts 62 until the end of the timer period. The clutch 59a immediately closes its contacts 61 and opens its contacts 63 thereby energizing the solenoid 60 and lighting the pilot 51. The solenoid 60, when it is energized, couples the source of pressurized air to the air-operated valve 42 which then opens. The pilot light 51, it will be remembered, signals to the operator that the mixture is being injected through the manifold 47. At the end of the cycle (i.e., zero time remaining on the timer motor 59b), contacts 62 are opened thereby de-energizing the solenoid 60 and pilot light 51.

Each of the timer mechanisms includes a set of normally-closed contacts (similar to the previously-described contacts 63 of the first controller section) which is actuated by the clutch and which couples the common junction of the normally-open contacts and the solenoid to the switch 70. When it is desired to clean the injection needles and the conduit containing the butter-phosphate mixture, the switch 70 is closed; and power is coupled directly to the solenoid for each of the stations in parallel so that the cleaning fluid is forced through the flexible conduits associated with each of the manifolds continuously and simultaneously with all of the other manifolds.

A second switch 71 is preferably interposed between the power line 56 and the control sections 55 for the stations on the other side of the injection table, but the operation is identical to that already described.

In physical layout, referring to FIG. 1 again, the timers are placed to the side of the table 25 in a controller cabinet designated by reference numeral 72. FIG. 5 is a transverse cross section view of the cabinet 72 showing the mounting of the timer 59 and the location of the switch 56 (the disconnect switch) the switch 70 (the switch for cleaning in place one set of controller sections) and 71 (the switch for cleaning in place the other set of controller sections).

As previously mentioned, an operator inserts the manifold into the breast or leg specified for his location, steps on the foot switch; and the butter-phosphate mixture is injected into that portion of the turkey carcass for the time period set on the timer. When the signal light goes off, the manifold is withdrawn from the carcass and inserted into the next turkey passing in front of the operator. Usually, the first station (i.e., 32 in FIG. 1) injects the lower breast, the second station the right leg, the third station the left leg, the fourth station the upper breast. The operation is duplicated on the opposite side of the table.

When it is desired to clean the conduit network in which the butter-phosphate mixture is circulated, a portable pump 80 (see FIG. 1A) is inserted in place of the pump 11 and a second portable pump 81 is inserted in place of the pump 22 (although, the operation may be done in separate steps with a single pump). A cleaning solution is then introduced into the holding tank 20 and circulated through all the conduits carrying the injection mixture including the flexible tubing connecting the manifold to the injection table. The switches 70 and 71 override the timing mechanism associated with each station and, as already mentioned, permit all manifolds to be continuously and simultaneously operated for flushing the same. The cleaning solution is then pumped back into the melting tank 10 by means of the pump 80, and it will be appreciated that the entire cleaning operation is accomplished without dismantling the system.

Having thus described in detail a preferred embodiment of a system according to the present invention, it will be obvious to persons skilled in the art that certain equivalent structure may be substituted for that which has already been described; and it is, therefore, intended that all such modifications and equivalents be covered as they are embraced within the spirit and scope of the appended claims.

We claim:
1. Apparatus for injecting a predetermined amount of a fluid mixture into poultry, comprising: a source of said mixture under pressure; injection means insertable in said poultry and coupled to said source including valve means for selectively opening and closing said injection means; control means including timer mechanism actuatable after said injection means is inserted into said poultry for opening said valve means for a preset time thereby coupling said pressurized source to said injection means and injecting a predetermined amount of said mixture into said poultry; and signal means energized by said control means for signalling when the injection of said pressurized mixture is terminated.

2. The apparatus of claim 1 wherein said timer mechanism is actuatable by an operator and said signal means is a visual signal characterized by being visible only when said valve means is open, said signal being turned off when said timer runs out.

3. The apparatus of claim 2 wherein said control means further includes a source of electrical energy; first switching means actuatable by said operator and connected in circuit with said timer mechanism and said source of electrical energy; second switching means actuated by said timer mechanism; selenoid means in circuit with said second switching means and said source of electrical energy for actuating said valve means for said preset time when said first switching means is actuated.

4. The apparatus of claim 3 further comprising third switching means connected in circuit with said source and said solenoid means for energizing said solenoid continuously and independently of said timer.

5. The apparatus of claim 1 wherein said injection means includes a plurality of flexible conduits coupled to said pressurized source; an injection head having needles communicating with their associated conduit for each such conduit; valve means for each of said conduits for controlling flow of said mixture thereto; and wherein said control means further includes overriding means for energizing said valve means simultaneously and continuously whereby a cleaning fluid inserted in said feed means may be continuously flushed through all of said injection heads at the same time.

6. A system for injecting a fluid mixture into poultry including: a source of said mixture; means providing an injection area and defining a plurality of operator stations; conveyor means for transporting individual birds adjacent said stations; injection means at each station including a flexible conduit and an injection manifold on one end of said flexible conduit and defining a plurality of needles adapted for insertion in said poultry; coupling means including a valve for coupling said source to each of said flexible conduits; pump means maintaining generally constant pressure in said coupling means; control means including a switch associated with each valve and independently actuatable by each operator for opening its associated valve a preset time thereby coupling the pressurized mixture to said injection means and forcing a predetermined volume thereof through said needles into said poultry; a signal light adjacent each station; and means for energizing the signal light associated with a station only when the valve associated with that station is open.

7. The system of claim 6 wherein said injection-area providing means includes an elongated table providing a central, longitudinal trough; and a temperature-regulated water bath at each of said stations for warming said injection manifolds when not in use thereby to prevent freezing of said mixture therein.

8. The system of claim 6 further including means for continuously opening all of said valves simultaneously; whereby when said mixture is replaced by a cleaning fluid all the piping and conduit of said system may be cleaned in place by actuating said last-named means.

9. In a system for injecting a fluid mixture into poultry, the combination comprising a source of said mixture under substantially constant pressure, means providing an injection area including at least first and second stations, conveyor means for transporting individual birds adjacent said stations, injection means at each station including a plurality of hollow needles supplied by said source and adapted for insertion into said poultry, control means including switch means at each station actuatable to cause said mixture to flow under said pressure through said injection means and into said poultry for a predetermined and settable time, the setting of the injection time at one station being independent of the setting at the other station whereby different amounts may be injected at each station, and overriding means for selectively continuously energizing said injection means at a station when said control means at that station is inoperable.

References Cited

UNITED STATES PATENTS

| 2,346,953 | 4/1944 | Walter | 99—256 |
| 3,035,508 | 5/1962 | Nelson | 99—257 |
| 3,232,209 | 2/1966 | Earl et al. | 99—257 |
| 3,334,570 | 8/1967 | Nordin et al. | 99—257 |

WALTER A. SCHEEL, Primary Examiner

J. M. BELL, Assistant Examiner

U.S. Cl. X.R.

27—24

Disclaimer 3,507,207.—*Alan B. Rogers*, Palos Park, *Donald V. Schwall*, Glen Ellyn, and *Russell W. Posegate*, La Grange Park, Ill. SYSTEM FOR POULTRY INJECTION. Patent dated April 21, 1970. Disclaimer filed Sept. 11, 1972, by the assignee, *Armour and Company*.

Hereby disclaims the entire term of said patent.

[*Official Gazette January 16, 1973.*]